US008770644B2

(12) United States Patent
Harders et al.

(10) Patent No.: US 8,770,644 B2
(45) Date of Patent: Jul. 8, 2014

(54) VEHICLE HAVING AN OVERHEAD CONSOLE

(71) Applicant: Volkswagen AG, Wolfsburg (DE)

(72) Inventors: Richard Harders, Wolfsburg (DE); Horst-Reiner Karg, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/850,113

(22) Filed: Mar. 25, 2013

(65) Prior Publication Data

US 2013/0214548 A1 Aug. 22, 2013

Related U.S. Application Data

(63) Continuation of application No. PCT/EP2011/004449, filed on Sep. 3, 2011.

(30) Foreign Application Priority Data

Sep. 25, 2010 (DE) .......................... 10 2010 046 612
Jul. 23, 2011 (DE) .......................... 10 2011 108 392

(51) Int. Cl.
*B60R 11/00* (2006.01)
*B60R 7/04* (2006.01)
*B60R 13/02* (2006.01)

(52) U.S. Cl.
CPC . *B60R 7/04* (2013.01); *B60R 11/00* (2013.01); *B60R 13/02* (2013.01)
USPC ............................ 296/37.7; 296/214; 224/311

(58) Field of Classification Search
USPC ..................... 296/24.34, 37.7, 37.8, 214, 210; 224/311, 328
See application file for complete search history.

(56) References Cited

U.S. PATENT DOCUMENTS

| 5,303,970 | A | * | 4/1994 | Young et al. ................ 296/37.7 |
| 6,749,244 | B1 | | 6/2004 | Song |
| 7,049,982 | B2 | | 5/2006 | Sleboda et al. |
| 7,158,377 | B2 | | 1/2007 | Mecca et al. |
| 7,306,276 | B2 | | 12/2007 | Berberich et al. |
| 2003/0098595 | A1 | * | 5/2003 | Carter et al. ............. 296/146.15 |
| 2003/0184108 | A1 | * | 10/2003 | Donovan et al. ............. 296/24.1 |
| 2008/0231704 | A1 | * | 9/2008 | Schofield et al. ............. 348/148 |
| 2009/0200821 | A1 | * | 8/2009 | Nagata ........................ 296/24.34 |
| 2010/0133410 | A1 | | 6/2010 | Gruener et al. |

FOREIGN PATENT DOCUMENTS

| DE | 36 03 198 A1 | 10/1986 |
| DE | 43 29 983 A1 | 3/1995 |
| DE | 19647200 C1 | 1/1998 |
| DE | 29 808 950 U1 | 7/2001 |

(Continued)

*Primary Examiner* — Glenn Dayoan
*Assistant Examiner* — Jason S Daniels
(74) *Attorney, Agent, or Firm* — Muncy, Geissler, Olds & Lowe, P.C.

(57) ABSTRACT

A vehicle having a roof lining which is bounded at the front by a front windscreen and has an overhead console which is extended toward the front by a front windscreen unit in the longitudinal direction of the vehicle, the covering element of the windscreen unit being attached to a front windscreen-end support at at least a first attachment point and to the overhead console at at least a second attachment point. The covering element being mounted so as to float with play in the longitudinal direction of the vehicle and/or in the lateral direction of the vehicle at the first attachment point, and is mounted without play at the second attachment point for accurate alignment with the overhead console.

20 Claims, 7 Drawing Sheets

(56) References Cited

FOREIGN PATENT DOCUMENTS

| DE | 103 56 150 A1 | 7/2004 |
| DE | 103 34 218 A1 | 2/2005 |
| DE | 10 2004 056 268 A1 | 8/2005 |
| DE | 10 2005 049 516 A1 | 6/2006 |
| DE | 10 2005 015 750 A1 | 10/2006 |
| DE | 10 2005 045 200 A1 | 3/2007 |
| DE | 10 2007 021 860 A1 | 11/2008 |
| DE | 10 2007 039 251 A1 | 2/2009 |
| DE | 10 2007 039251 A1 | 2/2009 |
| WO | WO 03/093 061 A1 | 11/2003 |
| WO | WO 2005/032889 A1 | 4/2005 |

* cited by examiner

VEHICLE HAVING AN OVERHEAD CONSOLE

This nonprovisional application is a continuation of International Application No. PCT/EP2011/004449, which was filed on Sep. 3, 2011, and which claims priority to German Patent Application No. DE 10 2010 046 612.3, which was filed in Germany on Sep. 25, 2010 and to German Patent Application No.: DE 10 2011 108 392.1, which was filed in Germany on Jul. 23, 2011, and which are all herein incorporated by reference.

BACKGROUND OF THE INVENTION

1. Field of the Invention

The invention relates to a vehicle having an overhead console.

2. Description of the Background Art

A plurality of functions and operating concepts are used in modern vehicles. To implement these functions and operating concepts, corresponding operating and display elements are provided for the vehicle occupants on a floor-mounted central console and/or on an overhead console mounted on the roof lining.

A vehicle, which has an overhead console, is known from DE 196 47 200 C1. The overhead console is extended forward to the windshield by a windshield unit in the longitudinal direction of the vehicle. In overhead modules of this type, it is very important to have a visually flawless, i.e., dimensionally accurate, transition between the overhead console and the windshield unit. To ensure this transition, in DE 196 47 200 C1, a cover hood of the windshield unit is, on the one hand, engaged with a windshield-end support, i.e., with an adhesive plate mounted on the windshield, and, on the other hand, pivotally attached directly to the overhead console at another attachment point. A dimensionally accurate assembly of the overhead console as well as the windshield unit hinged thereto is carried out as follows: The overhead console, together with the windshield unit hinged thereto, is first premounted on the roof lining of the vehicle. The pivot joint is located approximately in the transitional area between the windshield and the roof lining. Both the adhesive plate and the cover hood of the windshield unit are subsequently pivoted around the pivot joint to the inside of the windshield, and the adhesive plate is glued to the windshield. This results in a dimensionally accurate fixing position of the adhesive plate as well as the cover hood in relation to the overhead console.

During the assembly illustrated above, the adhesive plate is glued to the windshield at a comparatively late point in manufacturing, only after the windshield is glued into the body shell of the vehicle. In addition, the overhead console, together with the windshield unit, must be provided as a one-piece preassembled element, in which the windshield unit and the overhead console are movably coupled with each other by means of the aforementioned articulation in a structurally complex manner. The articulation between the windshield unit and the overhead console also takes up valuable installation space, which may no longer be used for laying electrical cables between sensors of the windshield unit and the overhead console.

SUMMARY OF THE INVENTION

It is therefore an object of the invention to provide a vehicle having an overhead console and a windshield unit, in which a dimensionally accurate transition between the windshield unit and the overhead console may be achieved in a technically simple manner.

In an embodiment, the invention is based on the underlying idea that the windshield unit and the overhead console are initially installable independently of each other during vehicle assembly. Accordingly, molded part and assembly tolerances are first allowed during installation of the windshield unit and overhead console, whereby an offset between the windshield unit and the overhead console resulting from tolerances may occur. The tolerated offset between the overhead console and the windshield unit is compensated for solely by the covering element of the windshield unit. For this purpose, the covering element of the windshield unit is not attached without play to the windshield-end support but instead is mounted so as to float with play in both the longitudinal direction of the vehicle and the lateral direction of the vehicle. In contrast thereto, however, the covering element is attached without play, i.e., in a stationary manner, to the overhead console, at another attachment point for dimensionally accurate alignment with the roof lining-end overhead console. In this manner, a tolerance-related side offset is allowed between the windshield-end support, which is covered by the covering element in the assembly location to shield it from view, and the overhead console. According to an embodiment of the invention, the windshield-end support, in particular an adhesive plate on which, for example, a multi-function camera and/or other sensors, such as a rain, light and/or moisture sensor, is/are supported, may thus be premounted independently of the vehicle assembly, and the adhesive plate, together with the windshield, may be glued in the vehicle body. The overhead console may be mounted independently thereof on the roof lining. A tolerance compensation is carried out by installing the covering element on the adhesive plate and on the overhead console only after the windshield has been finally glued to the vehicle body.

Due to the mounting so as to float in the lateral and longitudinal directions of the vehicle, the covering element may perform a tolerance compensation even if there is a larger, tolerance-related offset between the overhead console and the windshield unit without mechanical stresses occurring in the covering element.

For manufacturing reasons, a tolerance-related height offset between the windshield unit and the overhead console may be disregarded, so that only tolerances in the lateral and longitudinal directions are relevant. The aforementioned floating mounting of the covering element with regard to the windshield-end support, i.e., the adhesive plate, is therefore limited to the longitudinal and lateral directions. Correspondingly, a height stop, on which a supporting member of the covering element is supported in the vertical direction, may be provided at the first attachment point between the covering plate and the support. The height stop may have a horizontally oriented guiding section having two guiding members, located one on top of the other, which define a horizontally oriented guiding gap. The supporting members of the covering element may be fixed in the vertical direction in the guiding gap and moved in the longitudinal/lateral direction for the aforementioned tolerance compensation.

In contrast to the first attachment point between the covering element and the support, both a longitudinal stop and a lateral stop may be provided at the second attachment point between the covering element and the overhead console. This causes the covering element to be positioned without play in relation to the overhead console. In this manner, the covering element is dimensionally accurately aligned with the overhead console if there is a tolerance-related offset between the adhesive plate or the support and the overhead console.

In addition to the aforementioned longitudinal and lateral stops, a securing element may also be provided at the second attachment point, which secures the covering element against detachment from the overhead console. The securing element may preferably have interlocking latching contours of the covering element and the overhead console. Alternatively, the securing element may also be a threaded bolt or the like.

The windshield unit may be provided with various sensors of driver assistance systems as well as other function elements. Rain, light and/or moisture sensors as well as a multifunction camera should be mentioned as examples thereof. Alternatively or additionally, the windshield unit may also support a rear-view mirror. The mirror base thereof may be engaged with the windshield-end adhesive plate. For a stable fixing of the sensor elements and the rear-view mirror, it may be advantageous if the support is designed in two parts, including a plastic adhesive plate which supports the lighter-weight sensor elements and a supporting plate made of an injection molded metal for the much more massive rear-view mirror. In both cases, the mirror base of the rear-view mirror is guided through an opening in the covering element to the adhesive plate disposed thereunder to shield it from view. For assembly, the covering element may preferably be constructed in two parts with an additional insert. The facing, peripheral edge sections of the covering element and the insert delimit the opening in the covering element. In a two-part design of this type, the mirror base may be inserted into the adhesive plate while the covering element is still unmounted, independently of its cross sectional size, since the mirror base does not have to be guided through a covering element opening which is closed on the circumferential side.

The covering element may extend from the front end face of the windshield unit to the mirror base in the rear, starting in the longitudinal direction of the vehicle. Conversely, the insert may be disposed between the mirror base and the overhead console in the longitudinal direction of the vehicle. The insert, which is located between the mirror base and the overhead console, may be inserted into a recess in the first covering element which is open in the direction of the overhead console. The insert may be attached by itself to the covering element, independently of the overhead console, in particular using latching elements which are engageable with the peripheral area of the recess in the first covering element.

If greater assembly tolerances exist between the overhead console and the windshield-end support, the mirror base is no longer inserted centrically through the covering element opening, which results in an uneven gap dimension between the mirror base and the opening. To compensate for such an uneven gap dimension, a compensating ring may be provided, which surrounds the opening edge of the mirror base opening and/or is mounted in the mirror base opening so as to float in the longitudinal and lateral directions.

For the floating mounting according to the invention between the covering element and the windshield-end support, it is advantageous if the support is dimensioned to be much smaller than the covering element in the longitudinal and lateral directions. As a result, a free gap, whose gap width defines the play available for tolerance compensation, is provided between the windshield-end support and a side peripheral web of the covering element in the longitudinal and lateral directions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
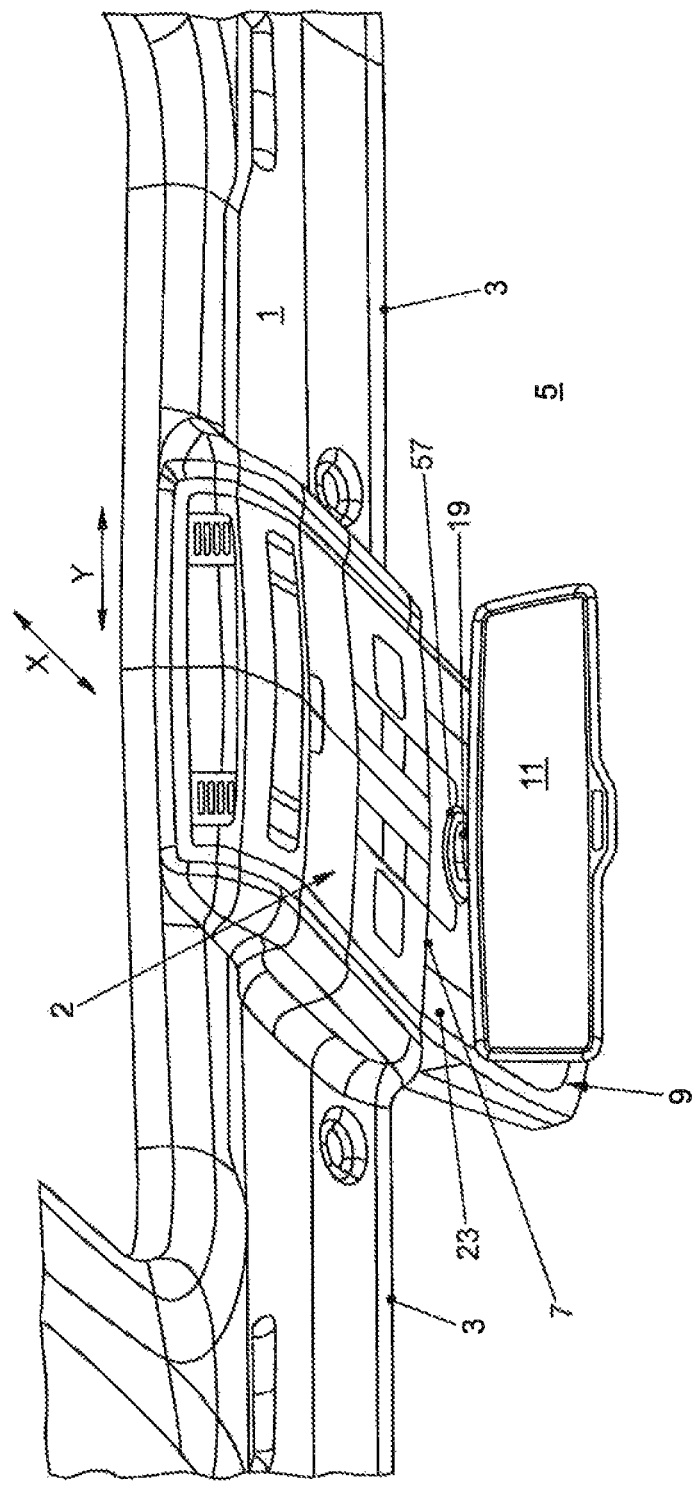
FIG. 1 shows a roof lining of a vehicle, viewed from below, which has an overhead console which is extended toward the front by a windshield unit in the longitudinal direction of the vehicle.

FIG. 1 shows roof lining 1, including an overhead console 2, in a view looking up from the vehicle interior. Front edge 3 of roof lining 1 delimits an indicated windshield 5. As furthermore shown in FIG. 1, overhead console 2 terminates approximately flush with front edge 3 of roof lining 1. At its front, overhead console 2 also merges flush with a windshield unit 9 via a narrow connecting gap 7 or a zero-width gap. Windshield unit 9 is fully mounted on windshield 5 in such a way that the back edge thereof is oriented in approximate alignment with front roof lining edge 3 in vertical direction z. Windshield unit 9 is furthermore connected to overhead console 2 essentially gap-free or without interruption at facing joints and aligned therewith in such a way that the two parts merge with each other seamlessly, i.e., steplessly, in both lateral direction y of the vehicle and longitudinal direction x of the vehicle. Overhead console 2 and windshield unit 9 together thus form a visually closed structural unit.

Figure 2:
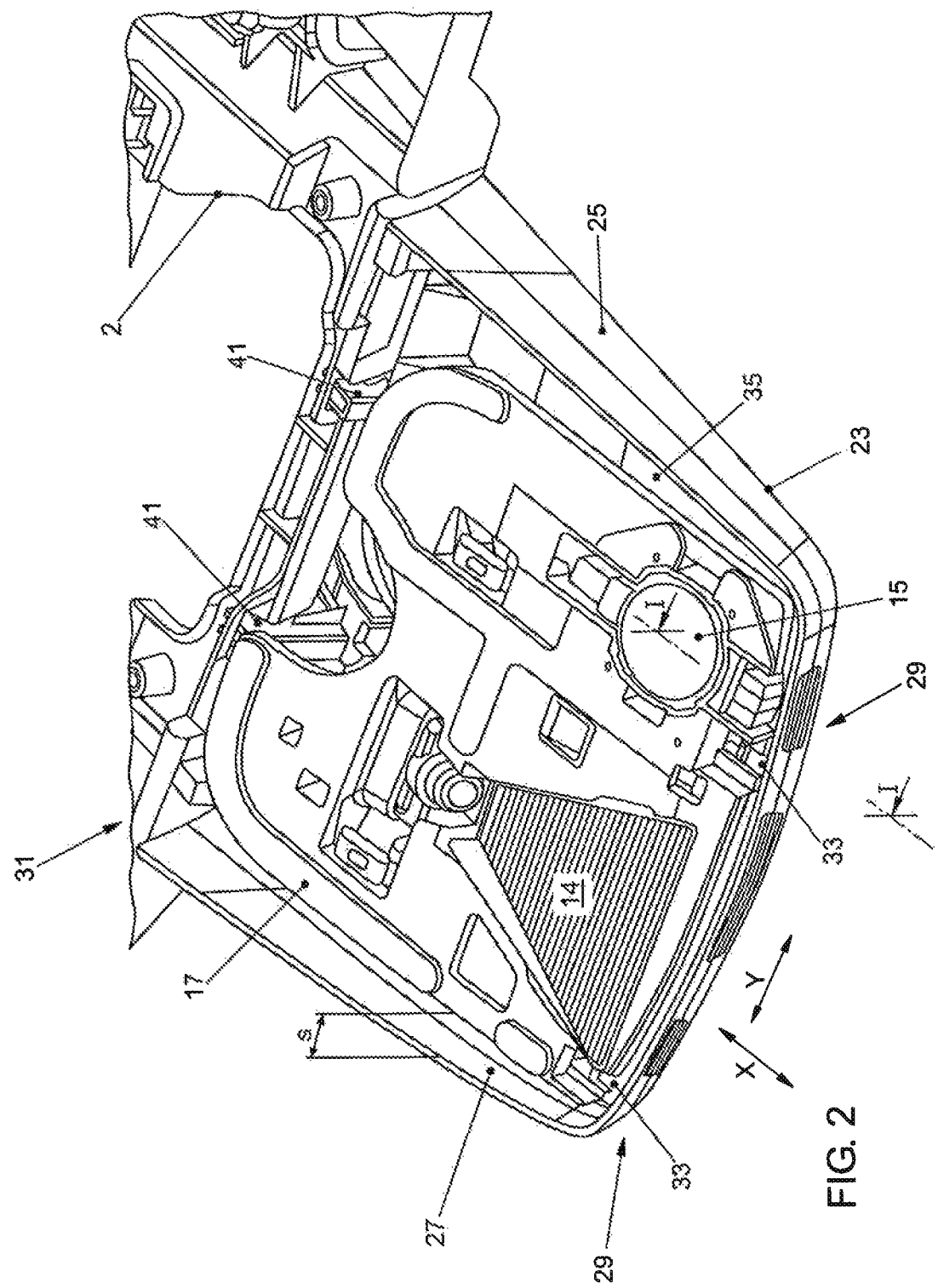
FIG. 2 shows a top view of the windshield unit, including the overhead console adjoined thereto toward the back in the longitudinal direction of the vehicle.

Windshield unit 9 supports rear-view mirror 11 illustrated in FIG. 1 as well as a multifunction camera 13 according to FIG. 2, which is directed forward in longitudinal direction x of the vehicle via a lens hood 14. According to FIG. 2, a rain, light and moisture sensor unit 15 is provided alongside lens hood 14. Camera 13 as well as sensor unit 15 are supported on a plastic adhesive plate by clip connections, which are not illustrated in further detail, while rear-view mirror 11, together with its mirror base 19, is supported separately on another adhesive plate 21, which is made of an injection molded metal part. Adhesive plate 21 of rear-view mirror 11 is shown only in FIG. 7. As is furthermore shown in FIG. 2, the two adhesive plates 17, 21 as well as function elements 13, 14, 15 affixed thereto are covered to shield them from view in the vehicle interior by means of an approximately hood-shaped covering element 23. Hood-shaped covering element 23 has a peripheral web 25 which is bent toward the edge. This upper edge is adapted to the contour and provided flush against windshield 5. Peripheral web 25 is also spaced a distance apart from adhesive plate 17 in lateral and longitudinal directions x, y by a free gap 27.

Figure 3:
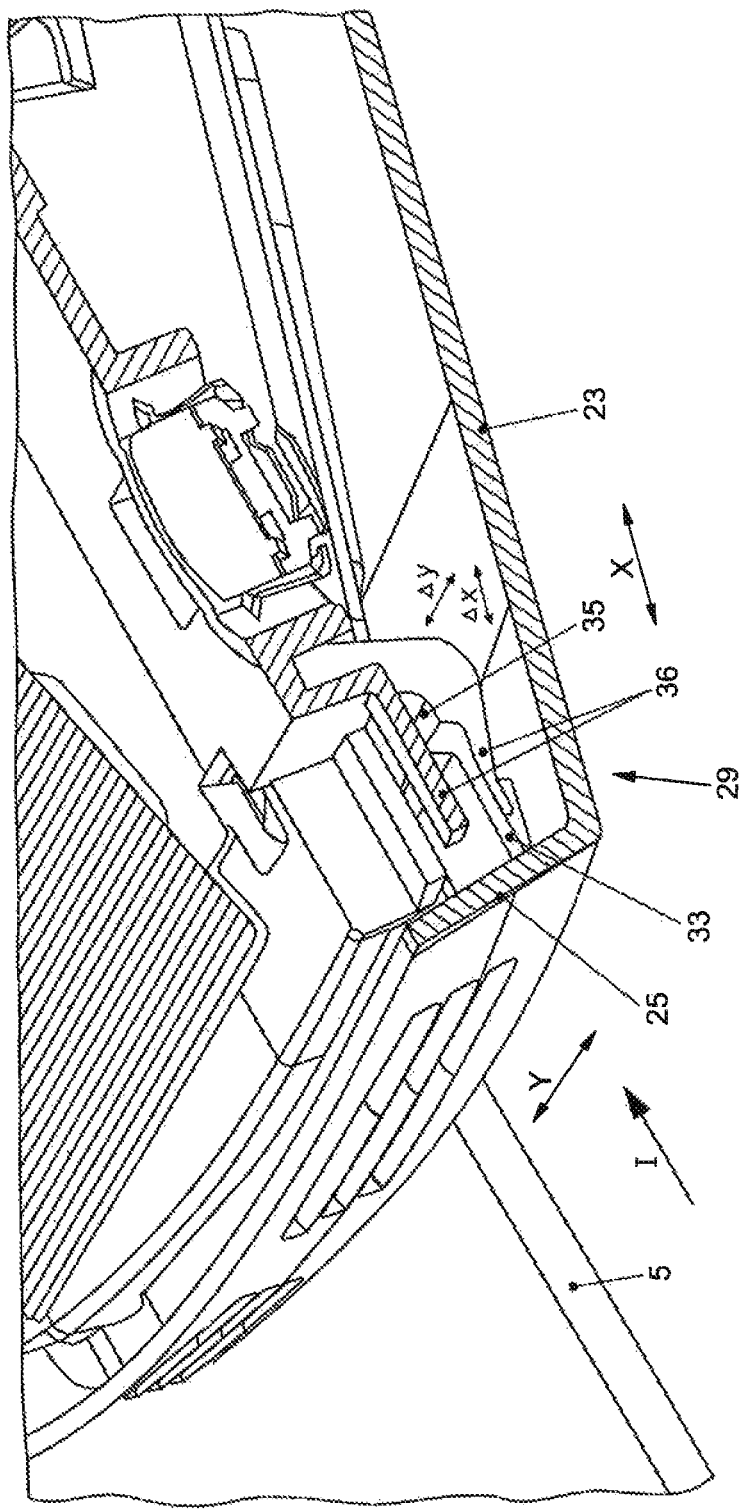
FIG. 3 shows a sectional representation along plane of intersection I-I from FIG. 2.
Figure 4:
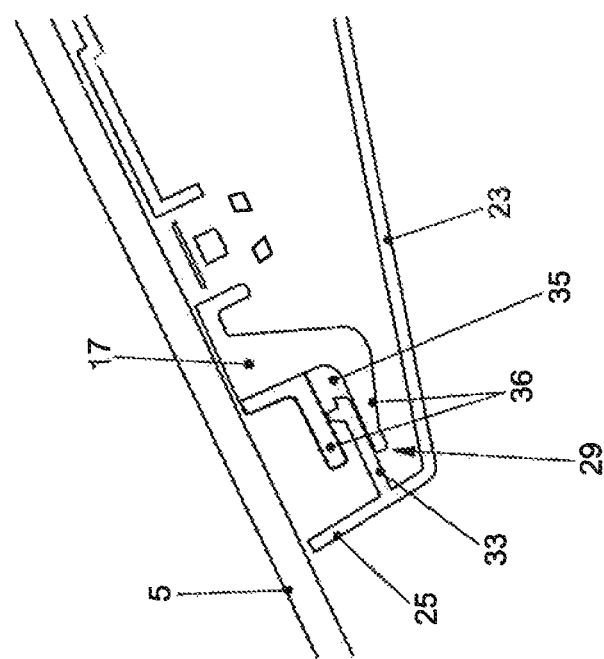
FIG. 4 shows another roughly schematic sectional representation of the floating mounting of the covering element.

As is furthermore shown in FIG. 2, covering element 23 is attached to adhesive plate 17 at first attachment points 29 on its front end face in longitudinal direction x of the vehicle. Covering element 23 is also attached on the back to overhead console 2 at a second attachment point 31. FIG. 3 shows a sectional view of one of first attachment points 29 along planes of intersection I-I from FIG. 2. As a result, a supporting member 33 projects approximately horizontally on the inside of peripheral web 25 of covering element 23, this, supporting member being moveably inserted into a guiding gap 35 in longitudinal direction x of the vehicle and in lateral direction y of the vehicle. Guiding gap 35 is defined by a plastic section which is injection-molded onto adhesive plate 17 and has two guiding members 36 disposed one on top of the other. The U section of adhesive plate 17 is dimensioned in such a way that covering element 23 is mounted so as to float in longitudinal direction x of the vehicle as well as in lateral direction y of the vehicle by means of play $\Delta x$, $\Delta y$. Available play $\Delta x$, $\Delta y$ is defined by gap width s (FIG. 2) of aforementioned gap 27 between adhesive plate 17 and peripheral web 25 of covering element 23. FIG. 4 also shows a schematic sectional side view of the floating mounting of covering plate 23 at first attachment point 29.

Figure 5:
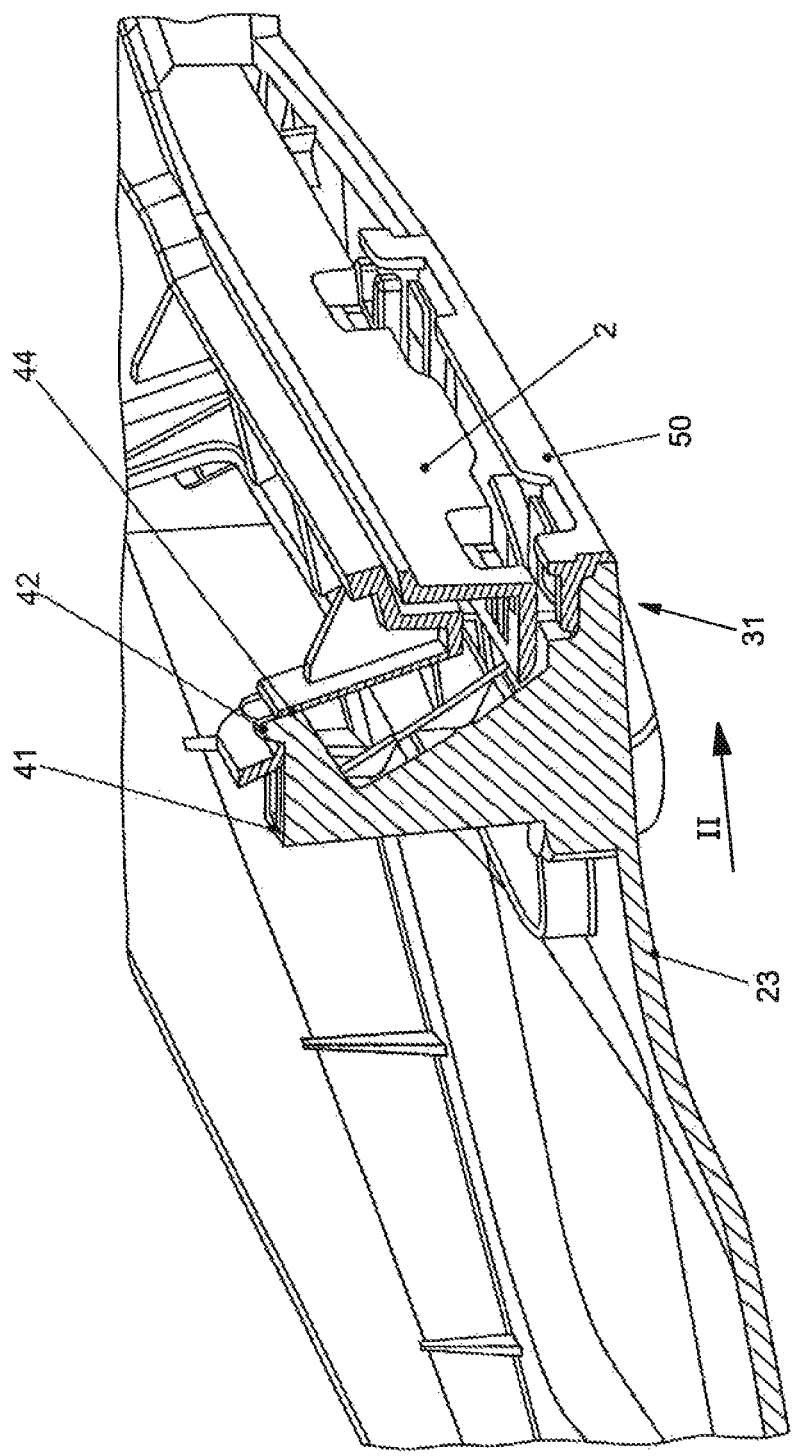
FIG. 5 shows another sectional representation of the attachment point between the covering element of the windshield unit and the overhead console adjoining toward the rear.
Figure 6:
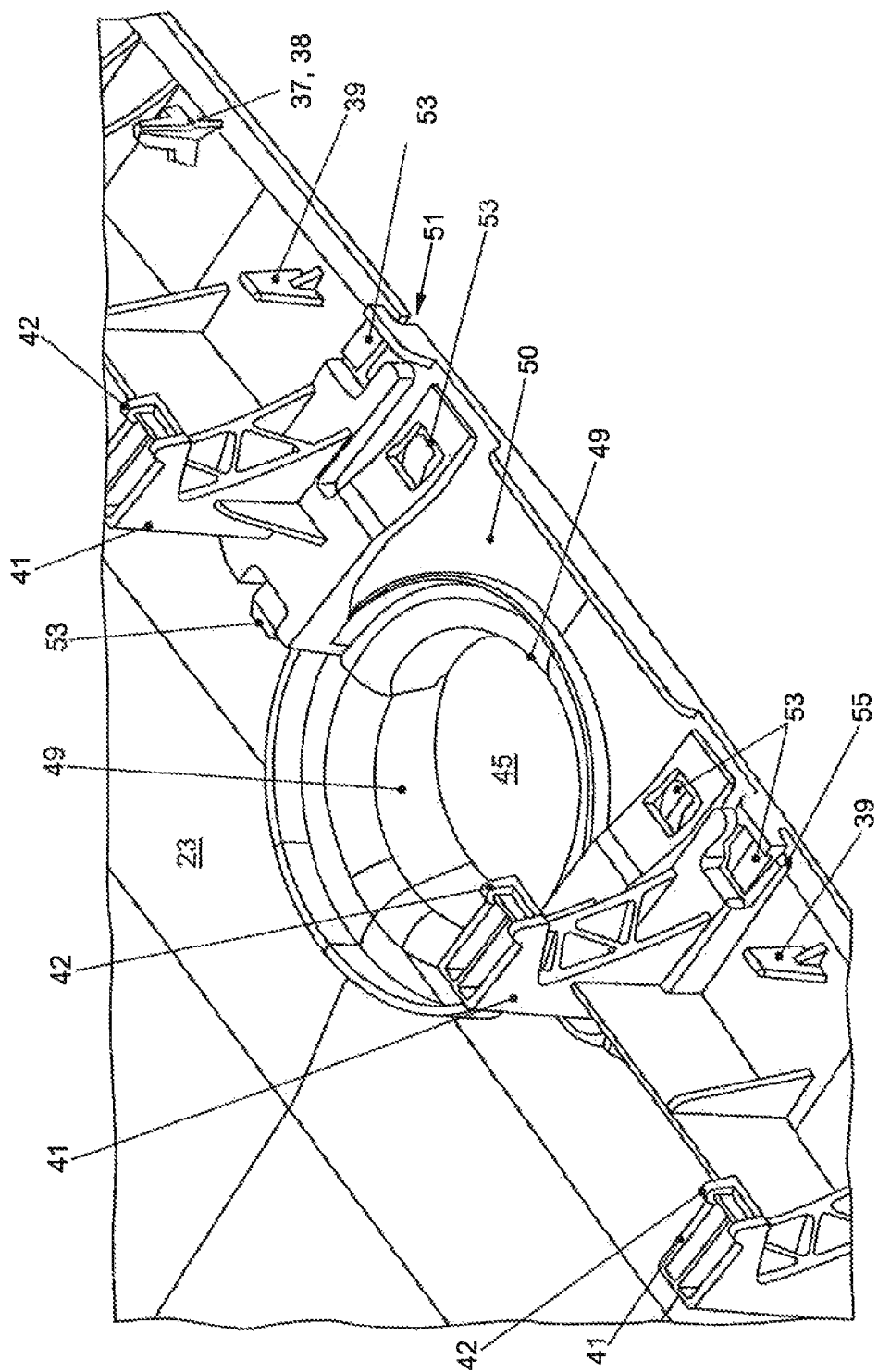
FIG. 6 shows the attachment point to the overhead console with the overhead console removed.

In contrast to FIGS. 3 and 4, FIG. 5 shows second attachment point 31 in an enlarged sectional representation. To permit dimensionally accurate alignment with overhead console 2, covering element 23 of windshield unit 9 is positioned without play, i.e., in a stationary manner without movement clearance in relation to overhead console 2, at second attachment point 31. According to FIGS. 5 and 6, a series of longitudinal and lateral stops 37, 38 as well as height stops 39, are provided as positioning aids, with the help of which covering element 23 may be positioned without play in relation to overhead console 2. In addition, latching elements 41 are molded onto covering element 23 according to FIGS. 5 and 6, whose upward-facing latching hooks 42 extend into corresponding latching recesses 44 in overhead console 2. FIG. 6 shows second attachment point 31, with overhead console 2 detached, latching elements 41 and movement stops 37 through 39 being peripherally molded onto overhead console 2 in its edge area. FIG. 6 also shows a mirror base opening 45, through which mirror base 19 of rear-view mirror 11 is guided in the assembled position. According to FIG. 6, mirror base opening 45 is defined by facing peripheral edge sections 47, 49 of covering element 23 and by an insert 50. According to FIG. 6, insert 50 is inserted, flush mounted in the installation position, into central, rectangular recess 51 of first covering element 23, which is designed to be open in the direction of overhead console 2 disposed thereunder. Insert 50 engages with a corresponding counter-contour 55 on the underside of covering element 23 by means of latching elements 53.

Figure 7:
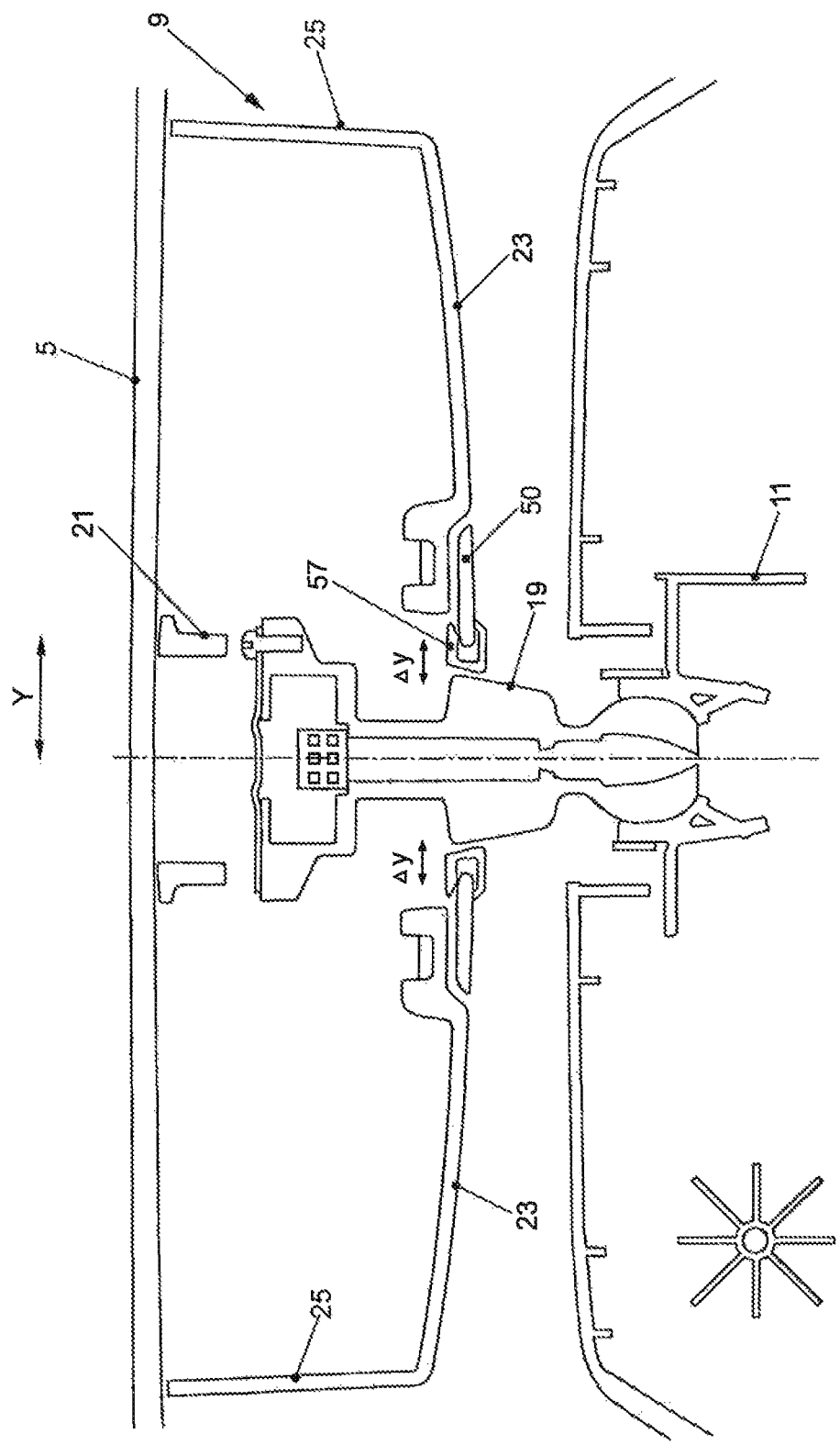
FIG. 7 shows a simplified sectional representation of the mirror base guided through the covering element.

FIG. 7 shows a modification of windshield unit 9 in a schematic sectional side view. Accordingly, mirror base 19 is engaged with adhesive plate 21 as mentioned above, and the one mirror base opening 45 of covering element 23 is guided. Mirror base opening 45 is defined in FIG. 7 by a compensating ring 57. This compensating ring surrounds peripheral edge sections 47, 49 of covering element 23 and insert 50 and is mounted so as to float in longitudinal and lateral directions x, y. Compensating ring 57, which is slideably mounted in this manner, may be used to compensate for uneven gap dimensions, which are otherwise clearly visible, between mirror base 19 and mirror base opening 45.

The assembly of overhead console 2 and windshield unit 9 is described below. In a premounting step, adhesive plates 17, 21 are first glued to the underside of windshield 5 facing the vehicle interior. Overhead console 2 is screwed to roof lining 1 independently thereof. Windshield 5, together with adhesive plates 17, 21 already attached thereto, is subsequently glued into the windshield frame of the vehicle body. In a subsequent assembly step, mirror base 19 of rear-view mirror 11, multifunction camera 13 and sensor unit 15 are then engaged with adhesive plates 17, 21. In another assembly step, in assembly direction I illustrated in FIG. 1, first covering element 23 is pushed onto first attachment point 29 in the vehicle direction, resulting in a floating mounting with play $\Delta x$, $\Delta y$ in the x and y directions. If necessary, an assembly-related dimensional tolerance between adhesive plates 17, 21 and overhead console 2 may subsequently be compensated for by correspondingly adjusting the covering plate 23, which is mounted so as to float. Covering plate 23 is then engaged in a positionally accurate manner with overhead console 2 at second attachment point 31 in assembly direction II shown in FIGS. 1 through 3, which corresponds to assembly direction I.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
    a windshield;
    a windshield unit;
    a roof lining that is delimited at a front by the windshield; and
    an overhead console that extends towards the front in a longitudinal direction of the vehicle to the windshield unit, a covering element thereof being attached to a windshield-end support at at least one first attachment point and to the overhead console at at least one second attachment point,
    wherein the windshield unit and the overhead console are first installable independently of each other during vehicle assembly with an offset between the windshield unit and the overhead console resulting from molded part and assembly tolerances,
    wherein the covering element is mounted so as to float with play in the longitudinal direction of the vehicle and in the lateral direction of the vehicle at the first attachment point to compensate for a tolerance-related offset between the overhead console and the windshield unit, and
    wherein the covering element is mounted without play at the second attachment point for dimensionally accurate alignment with the overhead console.

2. The vehicle according to claim 1, wherein the support has a height stop at the first attachment point, at which a supporting member of the covering element is supported in a vertical direction.

3. The vehicle according to claim 2, wherein the height stop at the first attachment point of the support has a guiding gap in which the supporting member is fixed in the vertical direction and which is movable in the longitudinal and lateral directions.

4. The vehicle according to claim 1, wherein the overhead console has longitudinal and lateral stops at the second attachment point that position the covering element without play in the longitudinal and lateral directions.

5. The vehicle according to claim 1, wherein at least one securing element is provided at the second attachment point, which secures the covering element against detachment from the overhead console.

6. The vehicle according to claim 5, wherein the at least one securing element secures the covering element via interlocking latching contours of the covering element and the overhead console.

7. The vehicle according to claim 1, wherein a rear-view mirror is affixed to windshield-end support, a mirror base thereof being guided through an opening in the covering element.

8. The vehicle according to claim 7, wherein the covering element extends backward towards the mirror base in the longitudinal direction of the vehicle.

9. The vehicle according to claim 7, wherein the insert is disposed between the mirror base and the overhead console in the longitudinal direction of the vehicle.

10. The vehicle according to claim 7, wherein the opening is delimited by peripheral edge sections of the covering element and by an insert.

11. The vehicle according to claim 10, wherein the insert is insertable into a recess in the covering element, which is open, in a direction of the overhead console.

12. The vehicle according to claim 10, wherein the insert is attachable exclusively to the covering element independently of the overhead console.

13. The vehicle according to claim 1, wherein the covering element has a compensating ring that surrounds an opening edge of a mirror base opening provided in the covering element.

14. The vehicle according to claim 13, wherein the compensating ring is mounted so as to float in the longitudinal and lateral directions.

15. The vehicle according to claim 1, wherein the cover element encompasses the windshield-end support on a side via a lateral peripheral web with a free gap, a gap width defining an available play of the covering element.

16. The vehicle according to claim 1, wherein the windshield unit and the overhead console are independent components.

17. The vehicle according to claim 1, wherein the windshield unit and the overhead console are structurally separate components.

18. The vehicle according to claim 1, wherein the windshield unit and the overhead console are disposed separate from each other.

19. A vehicle comprising:
a windshield unit; and
an overhead console including a covering element attached to a windshield-end support at a first attachment point and to the overhead console at a second attachment point, the windshield unit being independent from and positioned offset with respect to the overhead console,
wherein the covering element is mounted so as to float with play in a longitudinal direction of the vehicle and in a lateral direction of the vehicle at the first attachment point, and
wherein the covering element is mounted without play at the second attachment point.

20. An assembly method, comprising:
mounting a windshield unit onto a vehicle windshield; and
independently mounting an overhead console onto a vehicle roof lining, the overhead console being mounted with an offset between the overhead console and the windshield unit, the overhead console comprising a covering element attached to a windshield-end support at a first attachment point and to the overhead console at a second attachment point,
wherein the covering element is mounted so as to float with play in a longitudinal direction and in a lateral direction at the first attachment point, and
wherein the covering element is mounted without play at the second attachment point.

* * * * *